Patented May 5, 1964

1

3,131,567
MECHANISM FOR OBTAINING AN ADJUSTABLE RELATION BETWEEN THE ROTATION AND STRAIGHT-LINE TRANSLATION OF A ROLLING BODY
Leonard Francis Butler, London, England, assignor to National Research Development Corporation, London, England
Filed Nov. 9, 1961, Ser. No. 151,226
Claims priority, application Great Britain Nov. 14, 1960
5 Claims. (Cl. 74—1)

The present invention has for its object to provide mechanism for obtaining a required extent of rotation of a body for a given extent of translation of this body. In other words, and more specifically, the invention is directed toward a mechanism which will simulate the translational and rolling movement of any of a number of rollers of different diameters. Thus the mechanism of the instant invention is adapted to vary the rotational movement relative to the translational movement of a translated body of fixed diameter so as to obtain the required extent of rotation of other bodies for a given extent of translation of those bodies.

According to the invention, the mechanism comprises a carriage constrained to move in a straight line and having a cylindrical member supported upon it so as to be rotatable about an axis at right angles to the plane of movement of this carriage. Upon the carriage is mounted or otherwise carried a strip so as to be capable of longitudinal movement, and this strip is maintained in driving engagement with the cylindrical member. The mechanism also includes a straight guide adjustably inclined with respect to the line of movement of the carriage and engaged by the strip so that, as the carriage is moved with the cylindrical member and strip, the strip will be moved by the guide to rotate the said member an amount dependent upon the angle of inclination to which the guide is set.

A second strip may be provided upon the carriage and arranged so as to be in driving engagement with the opposite side of the cylindrical member relative to the first strip, a second adjustably inclined guide being provided for driving this second strip. The said first and second strips may be maintained in driving contact with the cylindrical member by spring loaded rollers. The guides may be arranged at fixed locations, one at each side of the carriage, so that one end of the strip at one side of cylindrical member will engage one of these guides and the opposite end of the strip at the other side of the said member will engage the other guide. By equally inclining the cam surfaces at opposite sides of the axis on which the carriage travels, the axis of the roller inherently will be maintained, by the equal movement of the strips, in fixed relationship to the carriage.

It is possible to construct the mechanism with only one guide and one driving strip, but in this case, it is, of course necessary for the cylindrical member to be journaled or pivoted upon the carriage.

From the foregoing description it will be seen that although, in effect, the cylindrical member can be considered as rolling along a plane, the amount of rotation it executes in so doing is subject to the extent of inclination of the guide or guides.

It will be appreciated that, although in some cases the surfaces of the strips which drivingly engage and rotate the roller may be smooth surfaces and that of the roller also smooth, the strips may, in other cases, present rack teeth and the roller be provided with teeth with which these racks engage.

In a known method of testing involute gear wheels, which usually involves the attachment of a base disc to the gearwheel and rolling this disc along a straight-edge, it is necessary to have a base circle disc for each particular

2 size and mode of gearwheel to be tested. A mechanism according to the invention is particularly suited for use in the testing of involute gears where base circles would otherwise be required, as it is possible to mount an involute gear upon the roller and adjust the angle or angles of inclination of the cam means. Thus, in the case where the strips are at right angles to the axis along which the carriage travels and the cams are provided one upon each side of this axis as hereinbefore described, let D equal the diameter of the base circle disc that would be required for use in testing an involute gear wheel and $d$ the diameter of the cylindrical body in the mechanism according to the invention, $\alpha$ the included angle between the two mutually inclined cams, which is bisected by the said axis, and $\phi$ equal to $$\frac{\alpha}{2}$$

Then $D = d \cot \phi$.

Instead of the strips being arranged at right angles to the axis along which the carriage moves, they may be arranged in a different angular relationship to this, for example each may be at right angles to the particular one of the mutually inclined cams by which it will be operated, in which case the relationship would be $D = d \operatorname{cosec} \phi$.

The invention will now be described, by way of example, with reference to the accompanying drawings, of which:

Figure 1:
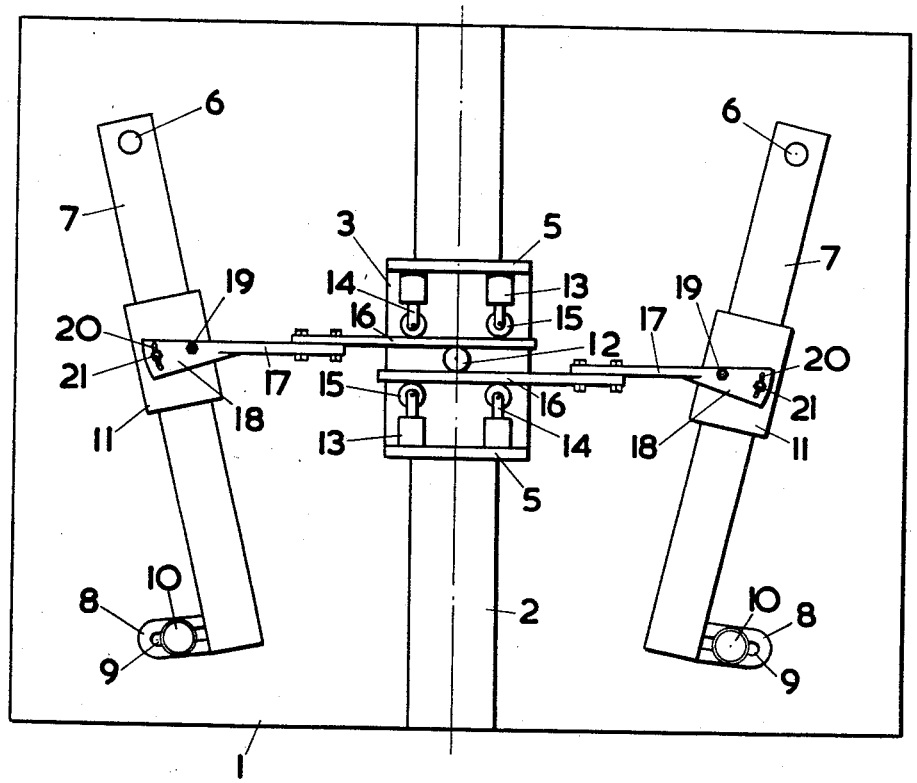
FIG. 1 is a plan of a mechanism according to the invention.
Figure 2:
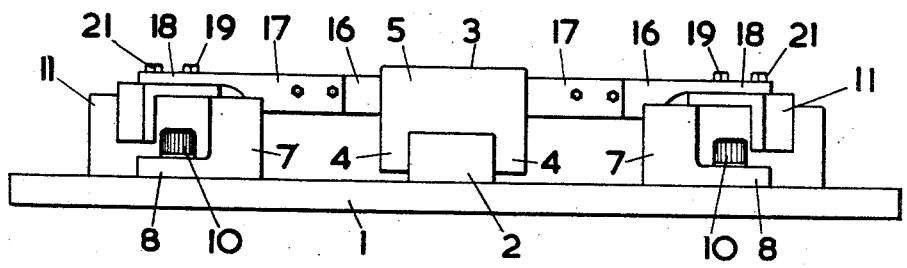
FIG. 2 is an end view.

In the form of the invention shown in the drawings, the mechanism comprises a base 1, upon which is fixed centrally a bar 2 of rectangular cross-section upon which is slidingly mounted a carriage 3, having downwardly extending side portions 4, 4, which guide the carriage in a straight path along the bar 2. Provided at the opposite ends of the carriage 3 are upwardly extending parts 5, 5, the purpose of which will be hereinafter described.

Pivoted each at one of its ends to the base upon a pivot 6 is a pair of cam bars 7, 7, each of which bars is provided at its opposite end with a lug 8 in which is formed an arcuate slot 9 through which passes a clamping bolt 10 having a knurled head, each of these bolts being screwed into the base 1.

Slidingly mounted upon each of the cam bars 7 is a saddle 11.

Resting endwise upon the carriage 3 is a roller 12, and carried upon the inner face of each of the previously mentioned upwardly extending parts 5 of the carriage 3 is a pair of cylinders 13 each containing a spring loaded plunger 14. At the outer end of each plunger 14 is carried a roller 15 which is pressed by the plunger onto a strip 16, there being two of these strips which are arranged one at the forward part of the periphery of the rolled 12 and the other at the rearward part of this periphery, the arrangement being such that the rollers 15 hold the inner or opposing faces of the strips 16 in frictional contact with the roller 12.

The outer end of each strip 16 is bolted to the inner end of a member 17, the outer end portion 18 of which is flattened and the inner part of which flattened portion is secured, by a bolt 19, to one of the saddles 11. The outer part of each flattened portion is provided with an arcuate slot 20 having its centre of formation upon the axis of the bolt 19. Passing through each slot 20 and screwed into the respective saddle is a bolt 21.

When the mechanism is to be used, the angles at which the cam bars are inclined to the centre bar 2 should be equal. Should they not be inclined at equal predetermined angles to the centre bar 2, this can be effected after slackening all the bolts 19 and 20 and the bolts 10, when each of the bars 7 may be swung about its pivot 6 to the required angle, after which all the said bolts may be tightened.

From the foregoing description, it will be seen that when the carriage 3 is moved in a direction in which the cam bars 7 diverge, the strips 16 will be moved outwardly and rotate the roller 12 in an anti-clockwise direction, while translating it with the carriage 3, whereas movement of this carriage in the reverse direction will cause the strips 16 to rotate the roller clockwise while translating it in the same direction as the carriage. By inclining the cam bars 7 at equal angles with respect to the line of movement of the carriage 3, the roller 12 will be maintained with its axis of rotation fixed with respect to the carriage 3.

I claim:

1. Mechanism for obtaining a required extent of rotation of a body for a given extent of translation of the body, comprising: a carriage; means constraining the carriage to move in a straight line; a cylindrical member supported upon the carriage so as to be rotatable about an axis at right angles to the plane of movement of the carriage; strip means for moving with said carriage in rotatable driving engagement with said cylindrical member and for moving transversely of said carriage for rotating said cylindrical member; and a straight guide adjustably inclined with respect to the line of movement of said carriage and engaged by said strip means so that, as the carriage is moved with the said member and strip means, the strip means will be moved due to the inclination of the guide to rotate the said member an amount dependent upon the angle of inclination of the guide.

2. Mechanism as set forth in claim 1 wherein said strip means comprises a pair of strips carried at least in part by said carriage, one at each side of the cylindrical member, so as to be capable of longitudinal movement transversely of the direction of movement of said carriage; and straight guides adjustably inclined with respect to the line of movement of the carriage and engaged by the strips for moving said strips in opposite directions.

3. Mechanism for obtaining the required extent of rotation of a body for a given amount of translation thereof, as claimed in claim 2, further comprising spring loaded rollers for maintaining the strips in driving engagement with the cylindrical member.

4. Mechanism for obtaining a required extent of rotation of a body for a given extent of translation of the body, as claimed in claim 2, in which the said guiding means are arranged at fixed locations one at each side of the carriage, so that one end of the strip at one side of the cylindrical member will engage one of these guides and the opposite end of the strip at the other side of said member will engage the other guide.

5. Apparatus for simulating the rolling and translational movement of bodies of various diameters, comprising: a carriage; means constraining the carriage to move in a straight line; a cylindrical member supported upon the carriage so as to be rotatable about an axis at right angles to the plane of movement of the carriage; means for rotating said cylindrical member in response to movement of said carriage; and means permitting adjustment of said last mentioned means so as to vary the rotation of said cylindrical member relative to the straight line movement of said carriage, whereby the rotation and translation of said cylindrical member can be made identical to the rotation and translation of rolling bodies of varying diameters.

References Cited in the file of this patent

UNITED STATES PATENTS

| | | |
|---|---|---|
| 2,108,414 | Schurr | Feb. 15, 1938 |
| 2,230,816 | Semar | Feb. 4, 1941 |
| 2,340,978 | Orcutt | Feb. 8, 1944 |

FOREIGN PATENTS

| | | |
|---|---|---|
| 376,496 | Great Britain | July 14, 1932 |